US009035760B2

(12) United States Patent
Reilhac et al.

(10) Patent No.: US 9,035,760 B2
(45) Date of Patent: May 19, 2015

(54) METHOD AND DEVICE FOR ASSISTING A DRIVER OF A MOTOR VEHICLE WHEN HE IS REMOVING HIS VEHICLE FROM A PARKING SPACE, AND MOTOR VEHICLE

(75) Inventors: Patrice Reilhac, Esslingen (DE); Harald Barth, Korntal-Munchingen (DE)

(73) Assignee: VALEO Schalter und Sensoren GmbH, Bietigheim-Bissingen (DE)

(*) Notice: Subject to any disclaimer, the term of this patent is extended or adjusted under 35 U.S.C. 154(b) by 59 days.

(21) Appl. No.: 13/988,386

(22) PCT Filed: Nov. 14, 2011

(86) PCT No.: PCT/EP2011/070025
§ 371 (c)(1), (2), (4) Date: May 20, 2013

(87) PCT Pub. No.: WO2012/069330
PCT Pub. Date: May 31, 2012

(65) Prior Publication Data

US 2013/0293369 A1 Nov. 7, 2013

(30) Foreign Application Priority Data

Nov. 23, 2010 (DE) ........................ 10 2010 052 304

(51) Int. Cl.
*B60Q 1/00* (2006.01)
*G08G 1/16* (2006.01)
*B60Q 9/00* (2006.01)

(52) U.S. Cl.
CPC *G08G 1/16* (2013.01); *B60Q 9/004* (2013.01); *G08G 1/168* (2013.01)

(58) Field of Classification Search
CPC ................ B60W 2550/308; B60W 2550/306; B60W 2550/302; B60W 2550/304; B60W 2540/12; B60W 2550/10; B60W 2540/20; B60W 30/16; B60W 2050/0071; B60W 30/06; G01S 13/931; G01S 13/9314; G01S 13/9317; G01S 13/9325; G08G 1/16; G08G 1/168; B60T 2201/10; B60T 2201/024
USPC ................... 340/431–436, 425.25, 441, 478; 180/271; 348/143, 148
See application file for complete search history.

(56) References Cited

U.S. PATENT DOCUMENTS 8,503,265 B2 * 8/2013 Akiyama et al. ................ 367/93
2002/0057195 A1 * 5/2002 Yamamura .................... 340/435

(Continued)

FOREIGN PATENT DOCUMENTS

EP 1731366 A1 12/2006
EP 1878615 A1 1/2008
EP 1685001 B1 6/2008

OTHER PUBLICATIONS

International Search Report issued in PCT/EP2011/070025 mailed on Feb. 21, 2012 (6 pages).

*Primary Examiner* — George Bugg
*Assistant Examiner* — Edny Labbees
(74) *Attorney, Agent, or Firm* — Osha Liang LLP

(57) ABSTRACT

The intention is to indicate a way in which a driver of a motor vehicle (1) can be warned particularly reliably, when he is removing his vehicle from a parking space (18), of the presence of a moving object (24) which is external to the vehicle, on a carriageway (23) adjoining the parking space (18). The object (24) is detected with the aid of sensor means (5 to 9), and by using sensor data of the sensor means (5 to 9) a current distance (26) of the object (24) from the motor vehicle (1) is determined. An image representation (27, 43, 64) is generated which shows a plan view of at least one area of the motor vehicle (1') and in which the distance (26) of the object (24) from the motor vehicle (1) is visually indicated. The image representation (27, 43, 64) is displayed on a visual display device (3).

12 Claims, 4 Drawing Sheets

(56) References Cited

U.S. PATENT DOCUMENTS

2008/0186382 A1* 8/2008 Tauchi et al. ................. 348/148
2008/0211644 A1 9/2008 Buckley et al.
2008/0306666 A1 12/2008 Zeng et al.
2010/0201508 A1 8/2010 Green et al.
2010/0253780 A1* 10/2010 Li ................................ 348/148

* cited by examiner

METHOD AND DEVICE FOR ASSISTING A DRIVER OF A MOTOR VEHICLE WHEN HE IS REMOVING HIS VEHICLE FROM A PARKING SPACE, AND MOTOR VEHICLE

The invention relates to a method for warning a driver of a motor vehicle of the presence of a moving object which is external to the vehicle, on a carriageway adjoining a parking space, when the motor vehicle is moving out of the parking space. The object is detected by sensor means of the motor vehicle, and a current distance of the object from the motor vehicle is determined using sensor data of the sensor means. The invention also relates to a device which is designed to carry out such a method, and also to a motor vehicle having such a device.

We are therefore concerned here with a driver assistance system by which the driver of a motor vehicle is assisted when removing the motor vehicle from a parking space. Such driver assistance systems are already prior art. They are also known by the designation "Cross Traffic Alert" systems. Such driver assistance systems have the function of informing the driver about the presence of other objects or obstacles which are located on the road adjoining the parking space. These driver assistance systems are based on the problem that for the driver it is often impossible to detect other crosswise-driving vehicles during the process of removing a vehicle from the parking space. This problem occurs, in particular, when a vehicle is being reversed out of the parking space.

A specified driver assistance system is known, for example, from document EP 1 685 001 B1. When a vehicle is removed from a parking space, the distance between the motor vehicle in question and another motor vehicle which is moving transversely with respect to the motor vehicle in question is measured using a sensor. A relative velocity of the crosswise-driving motor vehicle is determined with respect to the motor vehicle in question. A perpendicular distance between the rear of the motor vehicle in question and a lengthened driving line of the crosswise-driving vehicle is then calculated as a function of the relative velocity, the distance and the velocity of the vehicle in question. A measurement of risk is calculated from the perpendicular distance, and after a limiting value threshold for the measure of risk is exceeded, a warning device is activated. The instantaneous distance between the motor vehicle in question and the crosswise-driving motor vehicle can also be displayed by means of an optical distance display. This can be done, for example, by means of coloured light-emitting diodes.

The object of the invention is to indicate a way in which, in the case of a method of the type initially mentioned, the driver can be warned particularly reliably of the presence of the object which is external to the vehicle, on the carriageway adjoining the parking space.

This object is achieved according to the invention by means of a method having the features according to Patent Claim 1, and also by a device having the features of Patent Claim 14, as well as by a motor vehicle having the features of Patent Claim 15. Advantageous embodiments of the invention are the subject matter of the dependent patent claims and of the description.

A method according to the invention serves for warning a driver of a motor vehicle of the presence of a moving object which is external to the vehicle, for example of another motor vehicle, which is located on a carriageway adjoining a parking space. The motor vehicle is removed from the parking space. The object is detected by sensor means and a current distance of the object from the motor vehicle is determined using sensor data of the sensor means. According to the invention, an image representation is generated which shows a plan view of at least one area of the motor vehicle from above and in which the distance of the object from the motor vehicle is indicated visually. The warning of the driver includes the displaying of the image representation on a visual display device.

The core concept of the present invention is therefore to generate and display an image representation in which, on the one hand, at least one area of the motor vehicle is visually represented and, on the other hand, the distance of the object from the motor vehicle is also indicated visually. Such a procedure is particularly user-friendly, and the driver can, overall, be warned particularly reliably of a potential danger. In fact, in the displayed image representation on the display device the motor vehicle in question and the measured distance are indicated visually at the same time. Furthermore, with such a visual display device it is possible, with the displayed image representation, to indicate visually the measured distance of the object from the motor vehicle in a wide variety of ways, specifically in addition to the motor vehicle in question. Using the image representation, the driver cannot only particularly easily infer the current distance of the object but also, if appropriate, infer the current relative position of the object with respect to the motor vehicle. The simultaneous visual indication of the motor vehicle in question, on the one hand, and of the measured distance, on the other, therefore has, in particular, the advantage that by using the image representation the driver can obtain a good image of the actual instantaneous traffic situation without much effort.

The visual indication of the distance preferably includes the fact that in the image representation a symbol which represents or characterizes the object at its distance from the motor vehicle is visually highlighted. The image representation can therefore also show, in addition to the motor vehicle in question, a symbol which symbolizes the object which is external to the vehicle and whose distance from the motor vehicle in the image representation relates to the actual distance of the object from the motor vehicle. When the object approaches the motor vehicle, the symbol in the image representation also preferably approaches the depicted motor vehicle. By using the symbol, the driver can estimate relatively well and without much effort the risk of a collision between the motor vehicle and the object and, if appropriate, also react rapidly. The driver can therefore obtain a complete picture of the traffic situation. This embodiment also has the advantage that a corresponding symbol can also be displayed for other objects which are external to the vehicle, with the result that overall the respective distance from a multiplicity of objects which are external to the vehicle can be indicated visually, to be precise at the same time.

With respect to the symbol in the image representation, in principle two different embodiments are provided:

On the one hand, in order to visually indicate the current distance of the object from the motor vehicle, the symbol in the image representation can be moved continuously or incrementally in accordance with a current velocity of the object. Here, the symbol can be, for example, a pictogram in the form of a schematic motor vehicle or in the form of an outline of a motor vehicle which symbolizes in a schematic illustration the object which is external to the vehicle. This symbol can be represented on a small scale with respect to the motor vehicle in question. The image representation can, for example, have such an appearance that the entire motor vehicle in question is represented in a fixed or immobile fashion in the middle on the display device while the symbol can move in an area in the image representation which corresponds to the carriageway.

This embodiment ensures that the image representation on the display device is visually appealing and can be interpreted unambiguously.

On the other hand, it is possible to provide that a surrounding area of the motor vehicle which corresponds to the carriageway in the image representation is divided into a multiplicity of segments which are arranged distributed along the carriageway and are each assigned to a value range for the distance. Then the visual indication of the distance in the image representation can take place in such a way that at least that segment in whose value range the current distance occurs, from the multiplicity of segments, is visually highlighted as a symbol. The specified segments can also be configured differently and it is in principle possible to provide any desired number of segments. The number of segments can be, for example, in a value range from 3 to 10. The segments are therefore preferably located in an area of the image representation which corresponds to the carriageway adjoining the parking space. In the case of a transverse parking space, the segments in the image representation can therefore be located behind the motor vehicle and/or in front of the motor vehicle. Therefore, each segment is respectively assigned a different value range for the actual distance of the object from the motor vehicle, and at least that segment in whose value range the current distance of the object from the motor vehicle occurs is visually highlighted, for example by means of corresponding colouring. Such a procedure can be implemented with relatively low expenditure and can also be interpreted unambiguously.

Both specified alternatives have the advantage that by using the image representation on the display device the driver can detect particularly easily and unambiguously at what distance the object which is external to the vehicle is located from his own motor vehicle and whether or not it is possible to remove the vehicle from the parking space, if appropriate.

It proves particularly advantageous if the distance of the object from the motor vehicle is visually indicated up to a value which is higher than 20 meters, in particular higher than 30 meters. The distance of the object from the motor vehicle can be indicated visually, for example, up to a value of 30 m or 35 m or 40 m or 45 m or 50 m. By using the image representation on the display device the driver can therefore even detect objects which are at a distance from his own motor vehicle, and can therefore remove his own motor vehicle from the parking space particularly safely.

The sensor means by which the object which is external to the vehicle is detected can include, for example, at least one camera and/or at least one radar device. It is therefore possible for the object which is external to the vehicle to be detected by a camera and/or a radar device. A radar device has the advantage that it can detect an object which is external to the vehicle with a relatively large degree of accuracy and can also determine the distance of the object particularly precisely. If a camera is used, the image data of the camera can also be employed to generate the image representation.

By using sensor data of the sensor means it is also possible to determine a current velocity of the object. The velocity of the object and/or a variable calculated therefrom can then also be indicated visually in the image representation. Such a procedure ensures, in particular, that the vehicle is removed safely from the parking space; this ensures the velocity of the object or the variable calculated therefrom is a measure of the risk of a collision between the motor vehicle in question and the object which is external to the vehicle when the vehicle is removed from the parking space. The visual indication of the velocity and/or of the variable therefore makes it possible to avoid a collision between the motor vehicle and the object. In fact when the object has a relatively high velocity the driver would wait until the object has moved past his own motor vehicle.

The variable calculated from the velocity of the object can be, for example, a time (time to collision) which the object takes to reach the motor vehicle. The visual indication of this variable has the advantage that when the time up to the collision is calculated not only the velocity of the object but also the instantaneous distance of the object from the motor vehicle is taken into account. This variable therefore represents the actual and reliable measure of risk by which the risk of a collision between the object and the motor vehicle is described particularly precisely. The visual indication of this variable therefore ensures that the motor vehicle is removed safely from the parking space.

In one embodiment, the velocity and/or the variable are/is indicated visually in the image representation by colour coding. This can take a form, for example, such that the velocity of the object and/or the variable calculated therefrom are/is indicated visually by colour coding of the symbol which represents the object. By means of colour coding, the driver can particularly easily infer the velocity of the object and/or the variable calculated therefrom and therefore also the actual risk of a collision. If the specified time up to the collision is indicated visually by colour coding, for example the following colour coding can be provided:

green if the time up to the collision is greater than 7 seconds;

yellow if the time up to the collision is in a value range from 3 to 7 seconds; and red if the time up to the collision is less than 3 seconds.

In the indicated image representation, a direction of movement of the object can be visually indicated. The driver can then also detect the direction of movement of the object by using the image representation and he can direct his attention to that side of the motor vehicle from which the object which is external to the vehicle comes.

The functionality of the method according to the invention can also be combined with the functionality of a conventional parking aid: a parking aid includes, as is known, a multiplicity of ultrasonic sensors which are attached to a bumper of the motor vehicle and which measure the distance between the motor vehicle and an obstacle which is located in the region of the parking space. A parking aid therefore serves to sense distances between the motor vehicle and other obstacles which are located in the direct area next to the motor vehicle, up to approximately twelve meters, and also, under certain circumstances, directly bound the parking space. If the motor vehicle includes such a sensor device which is different from the known sensor means and has, in particular, at least one ultrasonic sensor, a distance which is measured by this sensor device between the motor vehicle and an obstacle located in the region of the parking space can be indicated visually in the image representation. It is therefore possible to indicate visually at the same time in the image representation the distance of the object which is external to the vehicle from the motor vehicle, on the one hand, and the distance between the motor vehicle and the obstacle located in the region of the parking space, on the other. Such a procedure has the advantage that by using the single display device or solely by using the displayed image representation, the driver can obtain a complete image of the entire parking situation without having to rely on a plurality of output devices or having to pay attention to a plurality of output devices at the same time. All that the driver needs to do is to consider the single visual display device in order to be able to inform himself about the entire traffic situation around the motor vehicle. With just a single look at the display device the driver can immediately recognize the risk of a collision owing to the object moving past the parking space and infer a distance between the motor vehicle and the obstacle in the region of the parking space. All the most important information can therefore be obtained with one look.

The warning of the driver can also include the fact that an acoustic sound is output, specifically in, particular taking into account the distance of the object from the motor vehicle and/or the velocity of the object. This can take the form, for example, that the frequency and/or the volume of the sound which is output are/is dependent on the distance of the object from the motor vehicle and/or the velocity of the object. It is possible, for example, for the relationship to apply that the smaller the distance of the object from the motor vehicle the higher the frequency of the sound and/or the louder the sound. In this way, the driver is also informed acoustically about the risk of a collision and said driver can avoid a collision even if he is not viewing the visual display device at the time.

A collision between the motor vehicle and the object can be avoided particularly reliably if the motor vehicle is being braked automatically, specifically after a predetermined braking criterion relating to the distance and/or the velocity of the object is met. This braking criterion can include the fact that the distance of the object is less than a predetermined limiting value and/or the velocity of the object is higher than a predetermined limiting value, and/or the specified time up to the collision is shorter than a predefined limiting value.

In one embodiment, the warning of the driver is carried out by taking into account a current velocity of the vehicle in question. This proves particularly advantageous, in particular in the embodiment in which the driver is warned by outputting an acoustic sound. The volume and/or the frequency of this acoustic sound can, in fact, also be set by taking into account the current velocity of the motor vehicle. For example, the following relationship can apply: the higher the velocity of the motor vehicle, the louder the acoustic sound and/or the higher its frequency.

It is preferably the entire motor vehicle which is shown in a plan view or from a bird's eye perspective in the image representation. The image representation can be generated in such a way that the motor vehicle is represented in the middle or centrally on the display device.

According to the invention, a device is also made available which is designed for warning a driver of a motor vehicle of the presence of a moving object which is external to the vehicle, on a carriageway adjoining a parking space, when the motor vehicle is moving out of the parking space. Said device comprises sensor means for detecting the object, as well as means for determining a distance of the object from the motor vehicle using sensor data of the sensor means. Furthermore, means for generating an image representation are made available which shows a plan view of at least one area of the motor vehicle from above and in which the distance of the object from the motor vehicle is indicated visually. The device also includes a visual display device for displaying the image representation.

A motor vehicle according to the invention includes a device according to the invention.

The preferred embodiments which are presented with respect to the method according to the invention, and the advantages thereof, apply correspondingly to the device according to the invention, as well as to the motor vehicle according to the invention.

Further features of the invention can be found in the claims, the figures and the description of the figures. All the features and combinations of features mentioned in the description above as well as the features and combinations of features specified in the description of the figures below and/or shown solely in the figures can be used not only in the respectively specified combination but also in other combinations or else alone.

The invention will now be explained in more detail using individual preferred exemplary embodiments and with reference to the appended drawings, in which.

Figure 1:
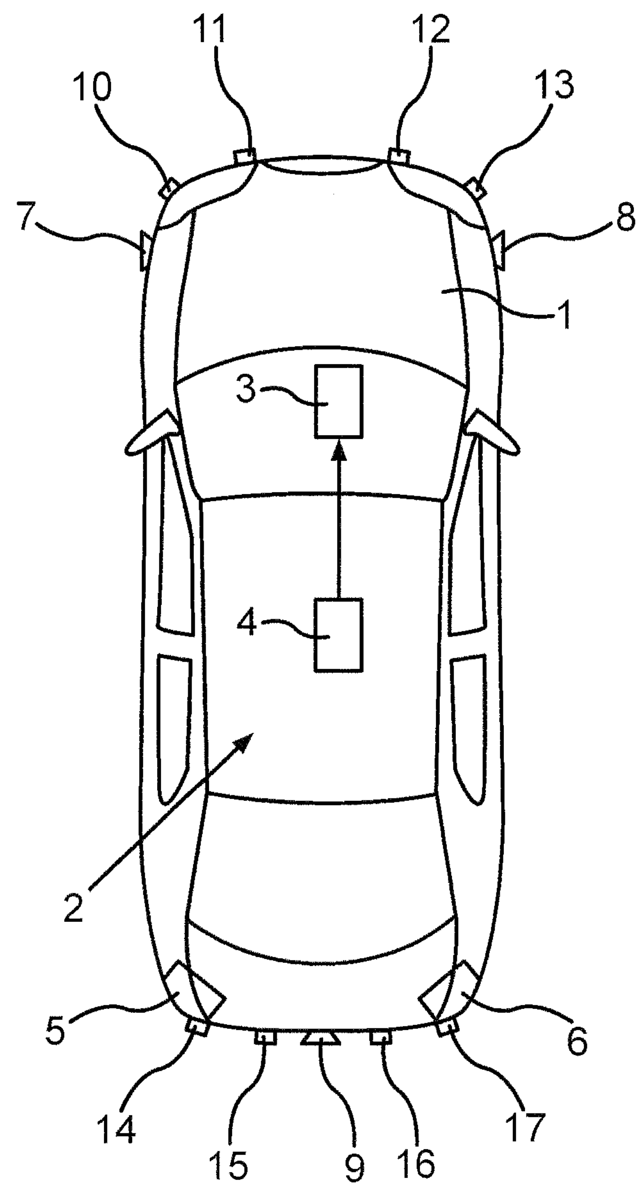
FIG. 1 is a schematic illustration of a motor vehicle with a device according to an embodiment of the invention.

A motor vehicle 1 which is illustrated in FIG. 1 is a passenger car in the exemplary embodiment. The motor vehicle 1 includes a device 2 which serves to assist a driver of the motor vehicle 1 when removing the vehicle from a parking space. The device 2 is therefore a driver assistance system, specifically what is referred to as "Cross Traffic Alert System". The device 2 includes a visual display device 3 which can be, for example, an LCD display or else a Head-up display. The device 2 also comprises a computing device 4 which actuates the display device 3. In this context, the computing device 4 can generate an image representation which is to be displayed on the display device 3.

The device 2 also includes two radar devices, specifically a first radar device 5 and a second radar device 6. The radar devices 5, 6 can be those which can emit frequency-modulated wave pulses (referred to as chirps) for detecting objects which are external to the vehicle.

The sensor data acquired by the radar devices 5, 6 is output to the computing device 4 which processes the sensor data.

The device 2 can also include optical cameras, for example a first camera 7 and a second camera 8. The cameras 7, 8 can be, for example, CMOS cameras or else CCD cameras. The first camera 7 can be mounted in the left-hand edge region of the front bumper, specifically in the front left-hand corner region of the motor vehicle 1. The second camera 8 can be mounted mirror-symmetrically on the other side of the motor vehicle 1, for example in the right-hand edge region of the front bumper or in the front right-hand corner region of the motor vehicle 1. If appropriate, a further camera 9 can also be made available, specifically at the rear of the motor vehicle 1, for example on a tailgate or else on the rear bumper. The cameras 7, 8, 9 and at least the camera 9 have relatively large capturing angles which may even be in a value range from 170° to 210°. The camera 9 can therefore also capture the respective lateral areas next to the motor vehicle 1.

The sensor data acquired by the cameras 7, 8, 9 is also transmitted to the computing device 4 and processed by the computing device 4.

Both the radar devices 5, 6 and the cameras 7, 8, 9 together form sensor means according to the present application.

The motor vehicle 1 also includes a multiplicity of ultrasonic sensors which are mounted both on the front bumper and on the rear bumper. To be precise, for example, four ultrasonic sensors 10, 11, 12, 13 can be mounted on the front bumper and four ultrasonic sensors 14, 15, 16, 17 can be mounted on the rear bumper. The ultrasonic sensors 10 to 17 can measure distances between the motor vehicle 1 and external obstacles which are located in the region of the motor vehicle 1. For example, the ultrasonic sensors 10 to 17 can have a range of approximately 5 to 15 meters. However, this range can also, under certain circumstances, be larger. The ultrasonic signals generated by the ultrasonic sensors 10 to 17 can also be transmitted to the computing device 4, and the computing device 4 can process these ultrasonic signals and calculate the respective distances from these ultrasonic signals.

Figure 2:
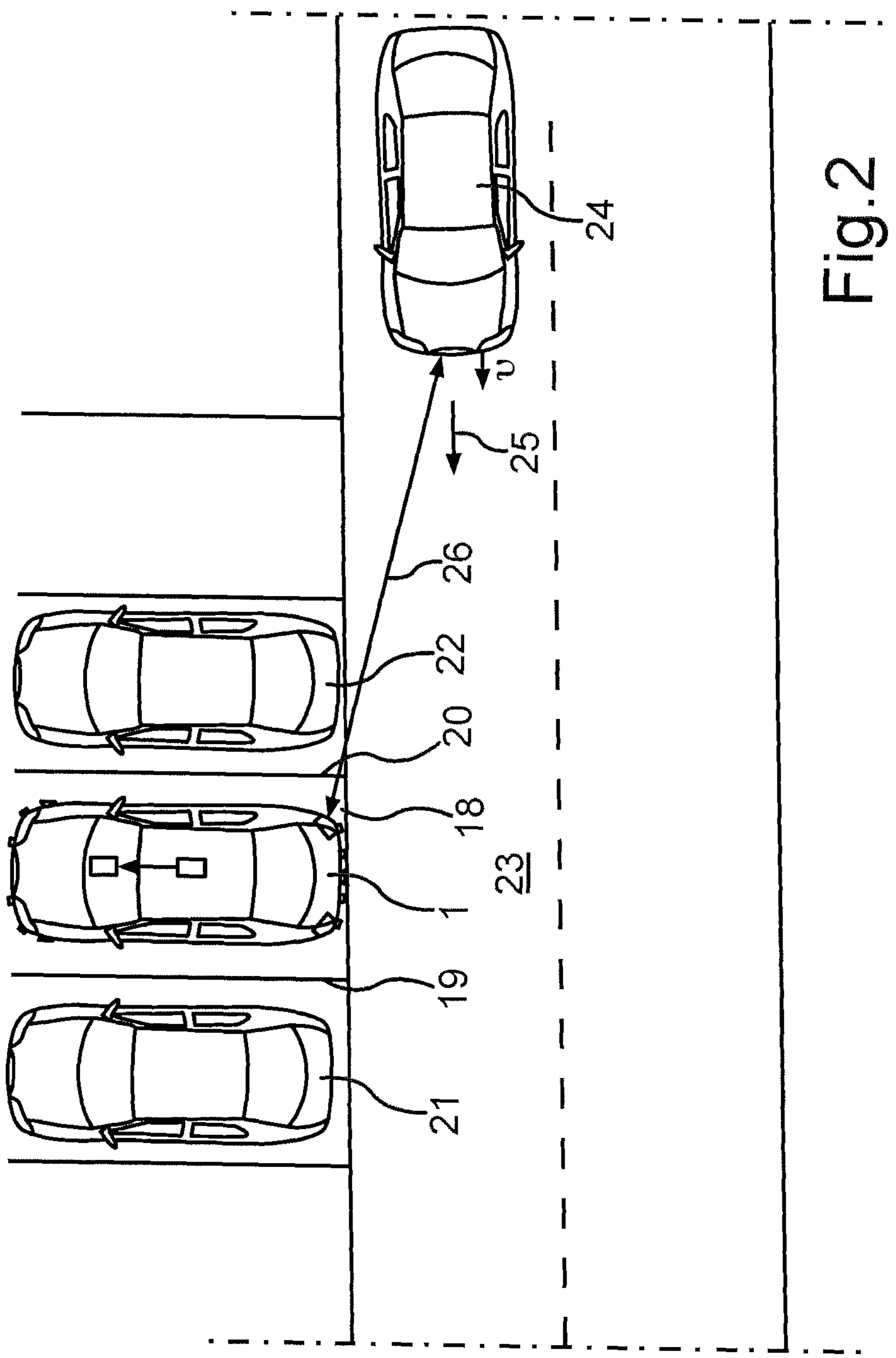
FIG. 2 is a schematic illustration of a plan view of a traffic situation, wherein a method according to an embodiment of the invention is explained in more detail.

As already stated, the device 2 serves to assist the driver when removing a vehicle from a parking space. Such a traffic situation in which the driver is assisted by the device 2 is illustrated in FIG. 2. The motor vehicle 1 is located in a parking space 18 which is bounded directly in the lateral direction by two boundary lines 19, 20. In addition to the parking space 18, there are also two other vehicles, specifically a vehicle 21 on the left-hand side and vehicle 22 on the right-hand side of the motor vehicle 1. In principle, the parking space 18 is therefore bounded by the other vehicles 21, 22.

Directly adjoining the parking space 18 is a carriageway 23, for example a road. The parking space 18 is here a transverse parking space which is oriented perpendicularly with respect to the carriageway 23. This means that the direction of the main extent of the parking space 18 or the longitudinal direction of the motor vehicle 1 encloses an angle of 90° with the direction of the main extent of the carriageway 23. The parking space 18 is therefore located directly next to the carriageway 23.

The driver then wishes to remove his motor vehicle 1 from the parking space 18. However, since the other vehicles 21, 22 directly bound the parking space 18, the driver cannot detect other vehicles (objects, which are located on the carriageway 23 and are moving transversely with respect to the motor vehicle 1 at all, or can only detect such vehicles with a large amount of expenditure. FIG. 2 illustrates another motor vehicle 24 as a moving object which is moving on the carriageway 23, specifically according to the arrow symbol 25. The motor vehicle 24 is driving on that lane of the carriageway 23 which directly adjoins the parking space 18. The device 2 provides a remedy here for this traffic situation which is difficult for the driver. By using the sensor data of the radar devices 5, 6 and/or the camera 9, the computing device 4 can detect the in-coming or crosswise-driving motor vehicle 24 and correspondingly warn the driver, specifically with the aid of the display device 3.

The computing device 4 determines the respective instantaneous distance 26 of the in-coming motor vehicle 24 from the driver's own motor vehicle 1 by using the sensor data of the specified sensor means (radar devices 5, 6 and/or camera 9). Furthermore, the computing device 4 determines a current velocity v of the other motor vehicle 24 by using the sensor data. The computing device 4 calculates, from the distance 26 and the velocity v of the other motor vehicle 24, a time which the motor vehicle 24 takes to reach the motor vehicle 1 in question (time up to the collision). The computing device 4 then generates an image representation in which, on the one hand, the motor vehicle 1 in question is depicted and, on the other hand, the distance 26 and the time up to the collision are also indicated visually.

Figure 3:
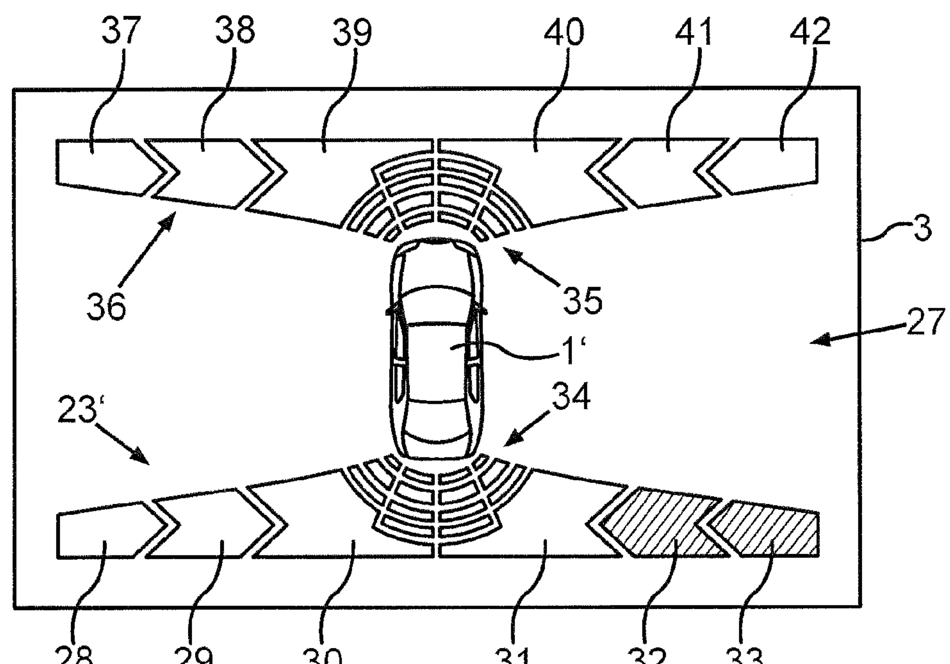
FIG. 3 is a schematic illustration of a visual display device with a displayed image representation according to a first exemplary embodiment.
Figure 4:
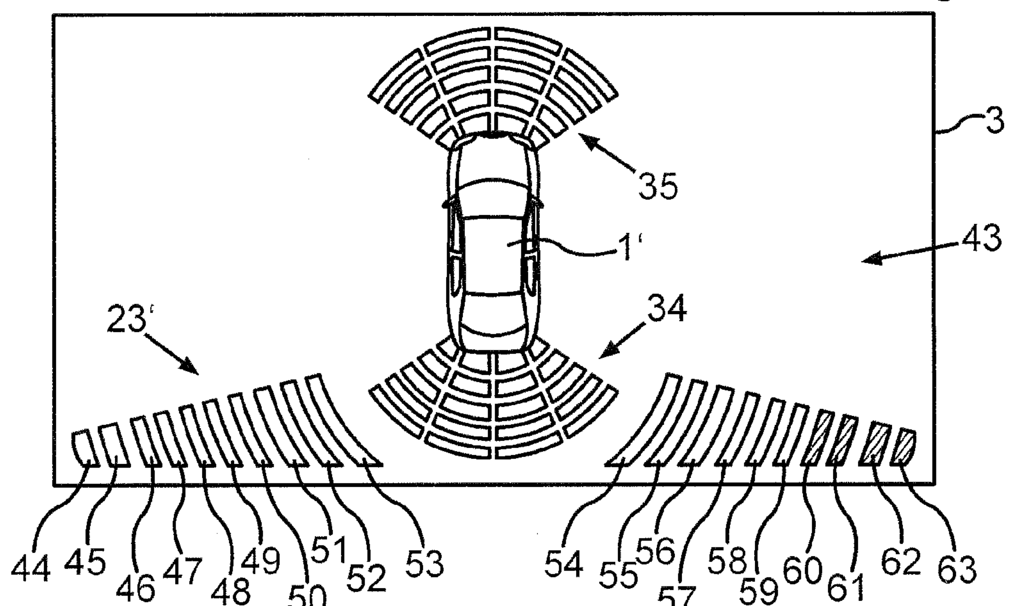
FIG. 4 is a schematic illustration of the display device with an image representation according to a second exemplary embodiment.
Figure 5:
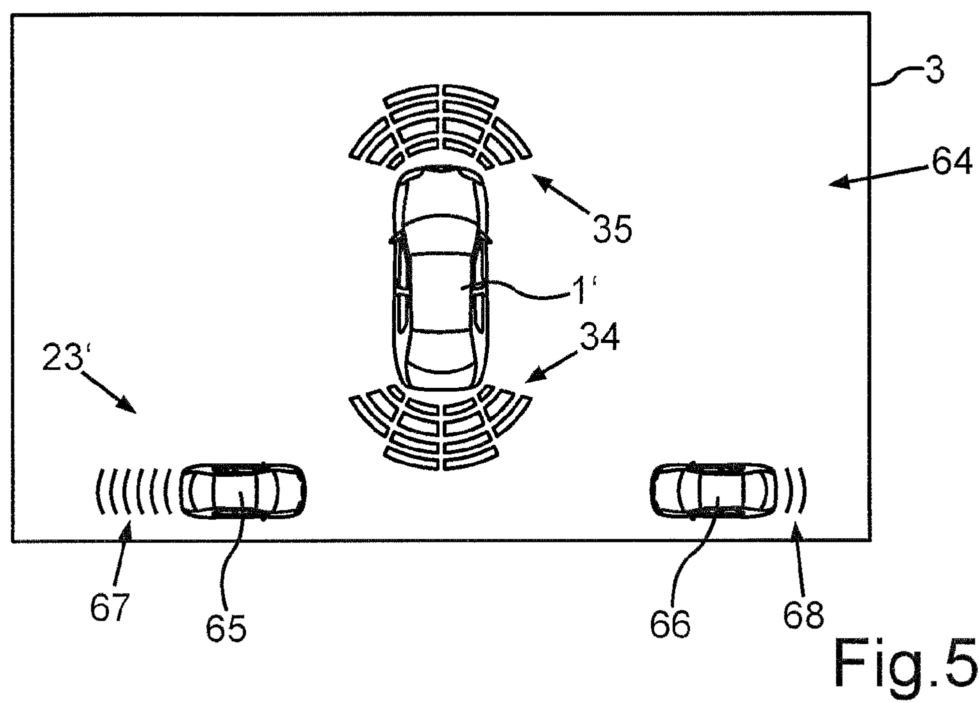
FIG. 5 is a schematic illustration of the display device with an image representation according to a third exemplary embodiment.

Exemplary image representations such as can be displayed on the display device 3 are illustrated in FIGS. 3 to 5. FIG. 3 shows an image representation 27 according to a first exemplary embodiment such as is displayed on the display device 3. The image representation 27 shows the motor vehicle 1' in question, specifically completely and centrally or in the middle of the display device 3. An image or an outline of the motor vehicle 1 can be stored, for example, in a memory in the computing device 4. A surrounding region 23', corresponding to the carriageway 23, of the motor vehicle 1' is divided into a multiplicity of segments 28 to 33 in the image representation 27. The segments 28 to 33 are arranged distributed behind the motor vehicle 1' over the length of the display device 3 in the image representation 27, specifically along the surrounding region 23' which corresponds to the carriageway 23. The segments 28 to 33 therefore extend in principle in the transverse direction of the vehicle behind the displayed motor vehicle 1'. Each segment 28 to 33 is respectively assigned another value range for the distance 26. In the exemplary embodiment according to FIG. 3, the region 23' is divided in total into six segments 28 to 33, specifically three segments on the left-hand side 28, 29, 30 of the motor vehicle 1' and three segments 31, 32, 33 on the right-hand side of the motor vehicle 1'. For example, only the following value ranges for the distance 26 can be specified: the outer segments 28, 33—that is to say the outer left-hand segment 28 and the outer segment 33 on the right-hand side—can be assigned to a distance 26 of greater than 30 meters. The respective middle segments 29, 32 can be assigned to a value range for the distance of 10 meters to 30 meters. Finally, the inner segments 30, 31 can be assigned to a distance of less than 10 meters.

If a moving object, for example the in-coming motor vehicle 24 (see FIG. 2), is then detected, that segment 28 to 33 in whose value range the current distance 26 of the motor vehicle 24 from the motor vehicle 1 in question occurs is visually highlighted with respect to the other segments 28 to 33. In this context, the direction of movement of the other motor vehicle 24 or the direction from which the motor vehicle 24 is coming is also taken into account. If the other motor vehicle 24 is located on the right-hand side of the motor vehicle 1 in question or if this other motor vehicle 24 is coming from the right-hand side, at least one of the right-hand segments 31, 32, 33 is highlighted. If another object is coming from the left-hand side, the left-hand segments 28, 29, 30 can be highlighted. If the current distance 26 in the traffic situation shown in FIG. 2 is, for example, 20 meters, the segment 32 is visually highlighted, for example by a corresponding colouring, as is indicated by hatching in FIG. 3. At the same time, the highlighting of the front segment can also be maintained, in the present case for example of the segment 33. The colouring of the segments 32, 33 can be set here as a function of the specified time up to the collision. For example, colour coding is conceivable here; this means that for different value ranges of the time up to the collision different colours of the segments 32, 33 can be respectively provided:

green if the time up to the collision is longer than 7 seconds;

yellow if the time up to the collision is in a value range from 3 to 7 seconds; and red if the time up to the collision is less than 3 seconds.

Therefore, in the image representation 27 the distance 26 and also the time up to the collision are indicated visually at the same time, specifically next to the depicted motor vehicle 1'. By using the display device 3 the distances which are measured with the aid of the ultrasonic sensors 10 to 17 which form a separate sensor device from the specified sensor means can also be indicated visually in the same image representation 27. The ultrasonic sensors 10 to 17 can be components of a parking aid. The distances measured by the ultrasonic sensors 10 to 17 can also be indicated visually using segments 34, 35 which can be displayed in the image representation 27 in addition to the segments 28 to 33. The segments 34, 35 are arcuate segments. Each ultrasonic sensor 10 to 17 can be assigned here a multiplicity of segments 34, 35 which are each located at different distances from the assigned ultrasonic sensors 10 to 17. The measured distances can also be indicated visually here by means of corresponding colouring. Each segment 34, 35 can also be assigned a value range for the distance. By means of the ultrasonic sensors 10 to 17 it is, for example, possible to measure distances between the motor vehicle 1 and the other vehicles 21, 22 which are located next to the motor vehicle 1 and directly bound the parking space 18.

It is also possible that the motor vehicle 1 is not removed from the parking space 18 backwards but rather forwards. It is, in fact, also possible for another carriageway to adjoin the parking space 18, for example on the other side of the parking space 18. In this case, objects which are external to the vehicle can also be detected, specifically using sensor data of the cameras 7, 8 and/or using sensor data from further radar devices which are possibly present and which can then be arranged in the front region of the motor vehicle 1. As in the image representation 27 according to FIG. 3, a further region 36, which corresponds to a further carriageway located in front of the motor vehicle 1, is also divided into a total of six segments 37 to 42. For the distance, in each case different value ranges are also assigned to these segments 37 to 42. The segments 37 to 42 have in principle the same function as the rear segments 28 to 33 and therefore serve for visually indicating distances as well as the time up to the collision with respect to another object which is moving on the carriageway located in front of the motor vehicle 1.

FIG. 4 shows an image representation 43 according to a second exemplary embodiment such as can be displayed on the display device 3. The image representation 43 corresponds essentially to the image representation 27 according to FIG. 3, with the difference that the area 23' is divided in total into twenty segments 44 to 63. In fact ten segments 44 to 53 are provided on the left-hand side and ten segments 54 to 63 are also provided on the right-hand side. The segments 44 to 63 are embodied in an arcuate shape here. Each of the segments 44 to 63 is also assigned a value range for the distance 26 here:

- the outer segments 44, 63 are assigned to a value range from 45 to 50 meters;
- the segments 45 and 62 are assigned to a value range from 40 to 45 meters;
- the segments 46 and 61 are assigned to a value range from 35 to 40 meters;
- the segments 47 and 60 are assigned to a value range from 30 to 35 meters;
- the segments 48 and 59 are assigned to a value range from 25 to 30 meters;
- the segments 49 and 58 are assigned to a value range from 20 to 25 meters;
- the segments 50 and 57 are assigned to a value range from 15 to 20 meters;
- the segments 51 and 56 are assigned to a value range from 10 to 15 meters;
- the segments 52 and 55 are assigned to a value range from 5 to 10 meters; and
- the segments 53 and 54 are assigned to a distance of less than 5 meters.

Corresponding segments 44 to 63 are also highlighted here by colouring. If the distance 26 is (see FIG. 2), for example, 32 meters, the segment 60 is highlighted in colour, wherein the colouring is, as already presented above, dependent on the current time up to the collision. At the same time, the previous segments 61 to 63 can also be highlighted or their highlighting can also be maintained.

FIG. 5 illustrates a further image representation 64 according to a third exemplary embodiment in the form in which it can be displayed on the display device 3. This image representation 64 also has in principle the same function as the image representations 27 and 43 according to FIGS. 3 and 4 with the result that only the differences between them are explained in more detail: in the region 23' corresponding to the carriageway 23, instead of the segments 28 to 33 and 44 to 63 pictograms or vehicle symbols 65, 66 are illustrated which are also, like the segments 28 to 33 and 44 to 63, symbols which represent or symbolize objects which are external to the vehicle (for example the motor vehicle 24). These vehicle symbols 65, 66 can be moved in the image representation 64 on the display device 3, specifically either incrementally or else continuously. The vehicle symbols 65, 66 are moved in accordance with the measured velocity of the respective objects which are external to the vehicle. In the exemplary embodiment according to FIG. 5, a vehicle symbol 65, 66, which symbolizes an actual object which is external to the vehicle, is respectively located on the left-hand side and on the right-hand side of the motor vehicle 1'. The vehicle symbol 66 can symbolize, for example, the other motor vehicle 24 in the form in which it is illustrated in FIG. 2. By colour coding the vehicle symbols 65, 66, the measured velocity of the respective objects and/or the time up to the collision can be indicated visually here. For example the colour coding already mentioned can apply here. In addition, the respective velocity of the objects can be indicated visually in such a way that the represented vehicle symbols 65, 66 each have a tail 67, 68 whose length is proportional to the measured velocity. The respective tail 67, 68 is therefore a symbol which indicates visually the velocity of the object which is external to the vehicle.

Only those objects 24 which are external to the vehicle and which move in the direction of the motor vehicle 1 are indicated visually in all the image representations 27, 43, 64. Objects 24 which are moving away from the motor vehicle 1 can be gated or filtered out here. The objects which are external to the vehicle are therefore displayed until they move past the motor vehicle 1.

It is also possible for the driver to be warned by means of an acoustic output device. It is possible, for example, to output an acoustic sound whose frequency and/or volume is dependent on the measured distance 26 and/or dependent on the velocity of the object 24 which is external to the vehicle. This volume and/or the frequency can also be dependent on the velocity of the motor vehicle 1 in question.

It is also possible to provide that the computing device 4 outputs control instructions to a brake system of the motor vehicle 1 on the basis of which the brake system is activated and the motor vehicle 1 is braked. The braking of the motor vehicle 1 can take place after a braking criterion is met, for example when the distance 26 undershoots a limiting value and/or the velocity v of the object 24 which is external to the vehicle is higher than a predetermined limiting value. The braking criterion can also be such that the motor vehicle 1 is braked automatically if the specified time up to the collision undershoots a limiting value.

The invention claimed is:

1. The method for warning a driver of a motor vehicle of the presence of a moving object which is external to the vehicle, on a carriageway adjoining a parking space, when the motor vehicle is moving out of the parking space, the method comprising:

- detecting the moving object by a sensor;
- determining a current distance of the moving object from the motor vehicle using sensor data of the sensor;

generating an image representation, which shows a plan view of at least one area of the motor vehicle and in which the distance of the moving object from the motor vehicle is indicated visually; and warning the driver by displaying the image representation on a visual display device, wherein the visual indication of the distance includes the fact that in the image representation a symbol which represents the moving object at the current distance from the motor vehicle is visually highlighted, wherein a surrounding area of the motor vehicle which corresponds to the carriageway in the image representation is divided into a multiplicity of segments which are each assigned to a value range for the distance, wherein the visual indication of the distance in the image representation includes the fact that at least that segment in whose value range the current distance occurs, from the multiplicity of segments, is visually highlighted as a symbol, and wherein in order to visually indicate the current distance of the moving object from the motor vehicle, the symbol in the image representation is moved continuously or incrementally in accordance with a current velocity of the moving object.

2. The method according to claim 1, wherein the distance is visually indicated up to a value which is higher than 30 m.

3. The method according to claim 1, wherein the sensor comprises a camera for detecting the moving object and/or a radar device for detecting the object.

4. The method according to claim 1, wherein a direction of movement of the moving object is visually indicated in the image representation.

5. The method according to claim 1, wherein a current velocity of the moving object is also determined using sensor data of the sensor, and the velocity of the moving object and/or a variable calculated therefrom are/is also visually indicated in the image representation.

6. The method according to claim 5, wherein the variable which is calculated from the velocity is a time which the moving object takes to reach the motor vehicle.

7. The method according to claim 5, wherein the velocity and/or the variable are/is indicated visually in the image representation by color coding, in particular color coding of the symbol.

8. The method according to claim 1, wherein a sensor device which is different from the sensor and comprises at least one ultrasonic sensor, senses a distance between the motor vehicle and an obstacle located in the region of the parking space, and wherein this distance is also visually indicated in the image representation.

9. The method according to claim 1 the warning of the driver also includes:

outputting an acoustic sound, in particular taking into account the distance of the moving object from the motor vehicle and/or the velocity of the moving object, and braking the vehicle after a predetermined braking criterion relating to the distance and/or the velocity of the moving object is met.

10. The method according to claim 1 wherein the warning of the driver is carried out by taking into account a current velocity of the motor vehicle.

11. A device for warning a driver of a motor vehicle of the presence of a moving object which is external to the vehicle, on a carriageway adjoining a parking space, when the motor vehicle is moving out of the parking space, having:

a sensor for detecting the moving object;

a determining unit that determines a distance of the object from the motor vehicle using sensor data of the sensor;

a generating unit that generates an image representation which shows a plan view of at least one area of the motor vehicle and in which the distance of the moving object from the motor vehicle is indicated visually; and a visual display device for displaying the image representation, wherein the visual indication of the distance includes the fact that in the image representation a symbol which represents the moving object at the current distance from the motor vehicle is visually highlighted, wherein a surrounding area of the motor vehicle which corresponds to the carriageway in the image representation is divided into a multiplicity of segments which are each assigned to a value range for the distance, wherein the visual indication of the distance in the image representation includes the fact that at least that segment in whose value range the current distance occurs, from the multiplicity of segments, is visually highlighted as a symbol, and wherein in order to visually indicate the current distance of the moving object from the motor vehicle, the symbol in the image representation is moved continuously or incrementally in accordance with a current velocity of the moving object.

12. A motor vehicle having a device according to claim 11.

* * * * *